US006756884B1

(12) United States Patent
Dijkstra

(10) Patent No.: US 6,756,884 B1
(45) Date of Patent: Jun. 29, 2004

(54) MODULAR TRAFFIC INFORMATION SYSTEM

(75) Inventor: Patrick Dijkstra, Elzenlaan 4, 3465TJ, Driebruggen (NL)

(73) Assignee: Patrick Dijkstra, Driebruggen (NL)

(*) Notice: Subject to any disclaimer, the term of this patent is extended or adjusted under 35 U.S.C. 154(b) by 200 days.

(21) Appl. No.: 09/906,030

(22) Filed: Jul. 13, 2001

Related U.S. Application Data

(63) Continuation-in-part of application No. 09/759,482, filed on Jan. 12, 2001.

(51) Int. Cl.[7] .................................................. B60Q 1/00

(52) U.S. Cl. ................................ 340/425.5; 340/426.1; 340/429; 340/539.1; 342/457

(58) Field of Search .......................... 340/426.1, 426.22, 340/425.5, 429, 990, 995, 901, 902, 426.25, 426.19, 426.14, 5.31, 539.1; 342/20, 357, 457, 388, 386, 389, 450

(56) References Cited

U.S. PATENT DOCUMENTS

| | | | | |
|---|---|---|---|---|
| 4,617,642 A | * 10/1986 | Clark | .................... | 340/825.89 |
| 5,481,073 A | * 1/1996 | Singer | ......................... | 361/805 |
| 5,986,543 A | * 11/1999 | Johnson | ....................... | 340/426 |
| 6,002,331 A | * 12/1999 | Laor | .......................... | 340/539 |

* cited by examiner

*Primary Examiner*—Anh V. La
(74) *Attorney, Agent, or Firm*—Moser, Patterson & Sheridan, LLP

(57) ABSTRACT

A modular traffic information system comprising a central processing unit positionable in a vehicle and a data storage unit; a viewable display unit positionable in a vehicle and adapted to act as a user interface between the central processing unit and an operator; an addressable bus coupled to the central processing unit; and at least one electronic component positioned within a vehicle and removably coupled to the central processing unit through the bus, the electronic component selected from the class of electronic components including receivers, transmitters and supplemental electronic components.

1 Claim, 5 Drawing Sheets

MODULAR TRAFFIC INFORMATION SYSTEM

RELATED APPLICATION

The present application is a continuation-in-part of co-pending application Ser. No. 09/759,482 filed Jan. 12, 2001.

BACKGROUND OF THE INVENTION

1. Field of the Invention

The present invention relates to a modular traffic information system and more particularly pertains to receiving and analyzing signals in a vehicle and generating a message in audible and viewable form in response to the analyzed signals.

2. Description of the Prior Art

The use of traffic systems of known designs and configurations is known in the prior art. More specifically, traffic systems of known designs and configurations previously devised and utilized for the purpose of analyzing signals and generating messages by known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,977,884 to Ross discloses a radar detector responsive to vehicle speed. Additionally, Japanese Patent Number JP09027096 to Shinichi discloses a speed excess alarming device. The subject matter of these patents is incorporated herein by reference.

While these devices fulfill their respective, particular objectives and requirements, the aforementioned patents do not describe a modular traffic information system that allows receiving and analyzing signals in a vehicle and generating a message in audible and viewable form in response to the analyzed sensor readings.

In this respect, the modular traffic information system according to the present invention substantially departs from the conventional concepts and designs of the prior art, and in doing so provides an apparatus primarily developed for the purpose of receiving and analyzing signals in a vehicle and generating a message in audible and viewable form in response to the analyzed signals.

Therefore, it can be appreciated that there exists a continuing need for a new and improved modular traffic information system which can be used for receiving and analyzing signals in a vehicle and generating a message in audible and viewable form in response to the analyzed signals. In this regard, the present invention substantially fulfills this need.

SUMMARY OF THE INVENTION

In view of the foregoing disadvantages inherent in the known types of traffic systems of known designs and configurations now present in the prior art, the present invention provides an improved modular traffic information system. As such, the general purpose of the present invention, which will be described subsequently in greater detail, is to provide a new and improved modular traffic information system and method which has all the advantages of the prior art and none of the disadvantages.

To attain this, the present invention essentially comprises a front patch box. The front patch box is positionable in the motor compartment of a vehicle. The front patch box has a plurality of disconnectable forwardly facing sensors. The sensors are adapted to receive a wide range of signals. The wide range of signals includes a radio wave sensors in a horizontal plane and a radio wave sensor in a vertical plane. The wide range of signals further includes optical sensors at different angles. A plurality of disconnectable extension sensors and transmitters are provided. The sensors include a temperature sensor and a shock/vibration sensor. Also included is a plurality of disconnectable forwardly facing transmitters. The transmitters are adapted to send a wide range of signals. The wide range of signals includes an optical transmitter and a radio frequency/microwave transmitter. A rear patch box is provided next. The rear patch box is positionable in the trunk of a vehicle. The rear patch box has a plurality of disconnectable rearwardly facing sensors. The sensors are adapted to receive a wide range of signals. The wide range of signals includes a radio wave sensor in a horizontal plane and a radio wave sensor in a vertical plane. Optical sensors at different angles are also included. Further provided is a plurality of disconnectable extension sensors and transmitters. The sensors include a temperature sensor and a shock/vibration sensor. Also included is a plurality of disconnectable rearwardly facing transmitters. The transmitters are adapted to send a wide range of signals. The wide range of signals includes an optical transmitter and a radio frequency/microwave transmitter. Next provided is a driver compartment patch box. The driver compartment patch box is positionable in a vehicle. The driver compartment patch box has a plurality of disconnectable supplemental electronic components. The electronic components include but are not limited to a mobile modem, a sound processor, a position system receiver, a mass storage device and extra extensions. The position system receiver is a global positioning system (GPS), a Loran or the like. The mobile modem includes a mobile phone modem adapted to receive and transmit data to a central information center. In this manner easy updating of the data storage units of a sound processor unit and the central processing unit and the display unit is allowed. The mobile phone modem is also adapted to allow easy transfer of information of the plurality of sensors and transmitters and supplemental electronic components to the central processing unit. The transferred information is in "real time" as well as from stored information out of one of the data storage units. A central processing unit is provided. The central processing unit is positionable in a vehicle. The central processing unit has a data storage unit. A front bus is coupled to the front patch box. A rear bus is coupled to the rear patch box. A driver bus is coupled to the driver compartment patch box. The central processing unit is adapted to process signals from the plurality of sensors and transmitters and supplemental electronic components. The central processing unit is further adapted to analyze the processed signals and make decisions based on the results of the combination of sensor readings and operator selections. The decisions made by the central processing unit are adapted to result in one or more of the following actions: storage of data, generating an audible message, generating a viewable message, starting an optical transmission, starting a radio transmission, and the like. The central processing unit is further adapted to manipulate any analyzed signal in a way as programmed and requested by a user. The central processing unit is further adapted to store and use stored information from the data storage unit of the central processing unit with the information adapted to be transferred from and to the data storage unit of the display unit. The central processing unit is even further adapted to auto-detect and use all of the sensors and transmitters and supplemental electronic components coupled to the front bus and rear bus and driver bus independent of which bus and which devices are connected. Further provided is a viewable display unit. The viewable display unit is positionable in a vehicle. The viewable display unit is adapted to act as a user interface between the central processing unit and an operator. The display unit makes use of a menu structure and so called "soft-keys" to allow easy and flexible configuration and use of the system. The display unit is adapted to show the received radio signals in a graphical form from which a user may witness the strength and frequency of received signals. The viewable form includes graphical information, alphanumeric representations of the graphical information and text messages, such viewable display also has a graphical representation with the y-axis representing the strength of any received signal and the x-axis representing the frequency of any received signal. The display unit is further adapted to store information and to use stored information from the data storage unit of the display unit. Such information is adapted to be transferred to and from the data storage unit of the central processing unit and adapted to be transferred to and from a home computer through a computer interface unit. A sound processor unit is also provided. The sound processor unit has a data storage unit. The data storage unit is removably coupled to the central processing unit to generate sounds and spoken text in response to a decision made by the central processing unit. The sound processor is further adapted to store sound files in the data storage unit of the sound processor unit. The sound files are adapted to be changed, replaced and added by the user by loading new sound files in the data storage unit of the display unit as through the computer interface unit. Such sound files are adapted to be automatically transferred to the data storage unit of the sound processor unit as soon as the display unit is connected to the central processing unit. Last provided is a standard home computer. The standard home computer has a computer interface unit. The interface is adapted to receive the display unit with its data storage unit for the manipulation and transfer of information between the data storage unit of the display unit and the standard home computer.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved modular traffic information system which has all of the advantages of the prior art traffic systems of known designs and configurations and none of the disadvantages.

It is another object of the present invention to provide a new and improved modular traffic information system which may be easily and efficiently manufactured and marketed.

It is further object of the present invention to provide a new and improved modular traffic information system which is of durable and reliable constructions.

An even further object of the present invention is to provide a new and improved modular traffic information system which is susceptible of a low cost of manufacture with regard to both materials and labor, and which accordingly is then susceptible of low prices of sale to the consuming public, thereby making such modular traffic information system economically available to the buying public.

Even still another object of the present invention is to provide a modular traffic information system for receiving and analyzing signals in a vehicle and generating a message in audible and viewable form in response to the analyzed signals.

Lastly, it is an object of the present invention to provide a new and improved modular traffic information system comprising a central processing unit positionable in a vehicle and a data storage unit; a viewable display unit positionable in a vehicle and adapted to act as a user interface between the central processing unit and an operator; an addressable bus coupled to the central processing unit; and at least one electronic component positioned within a vehicle and removably coupled to the central processing unit through the bus, the electronic component selected from the class of electronic components including receivers, transmitters and supplemental electronic components.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
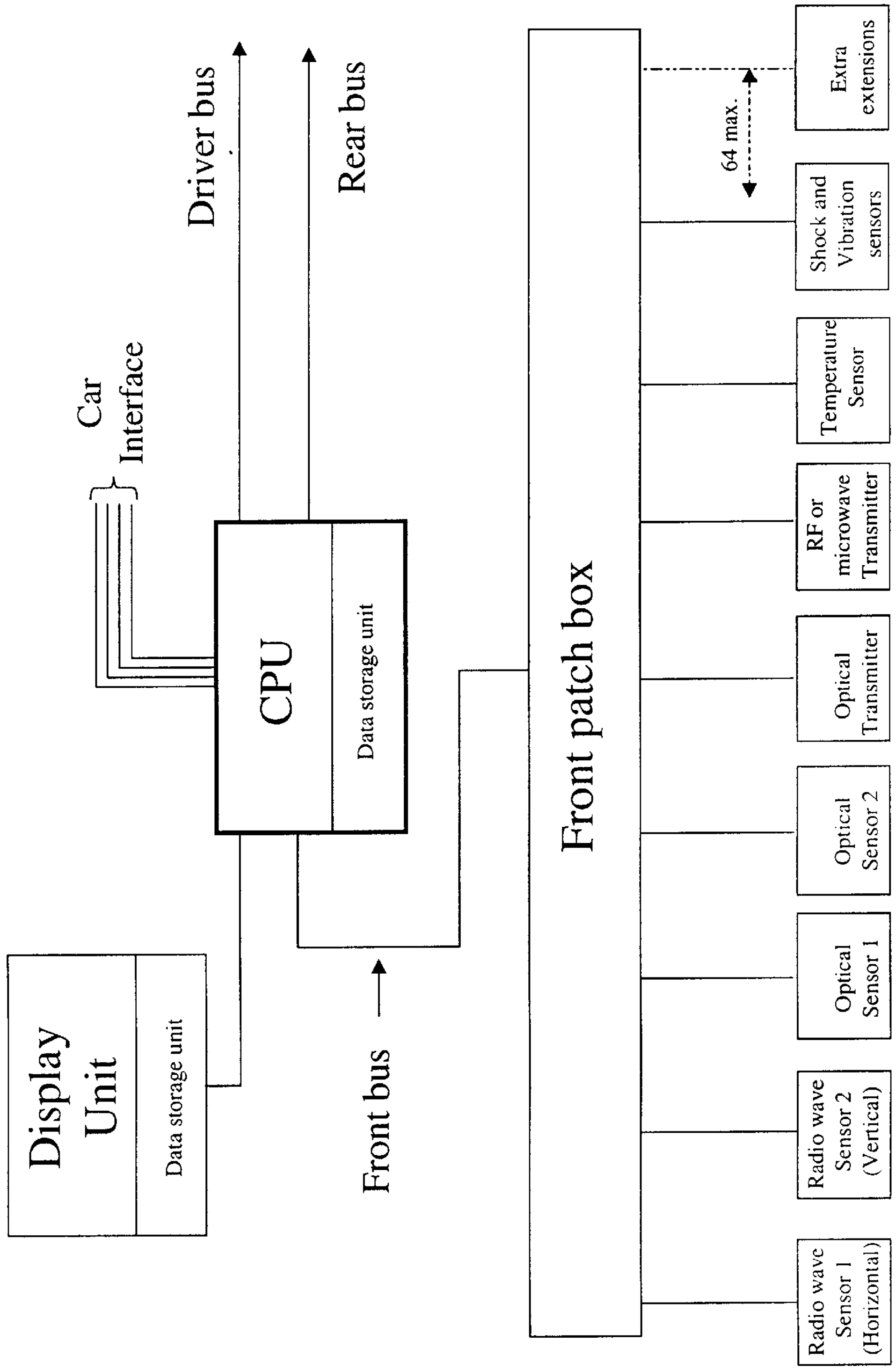
FIG. 1 is an electrical schematic of a modular traffic information system constructed in accordance with the principles of the present invention.
Figure 2:
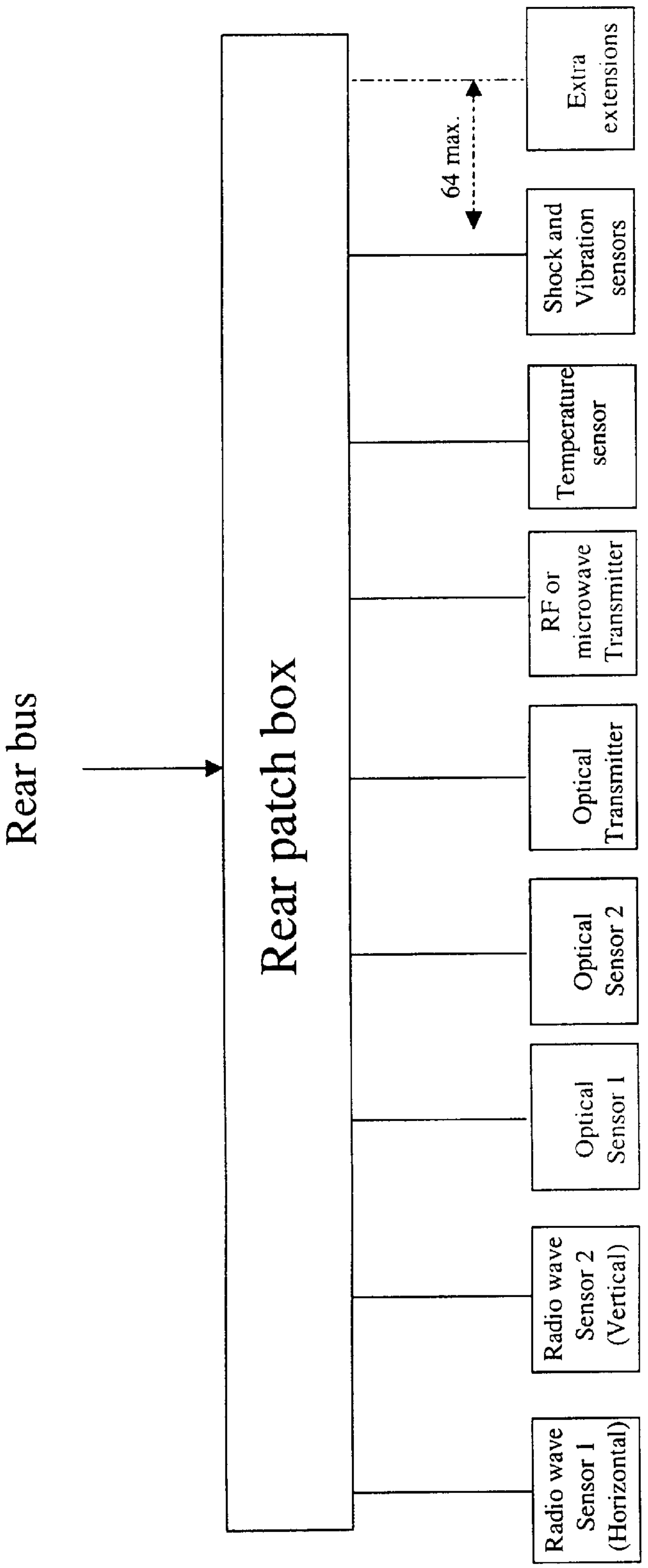
FIG. 2 is an electrical schematic of the front patch box and its components.
Figure 3:
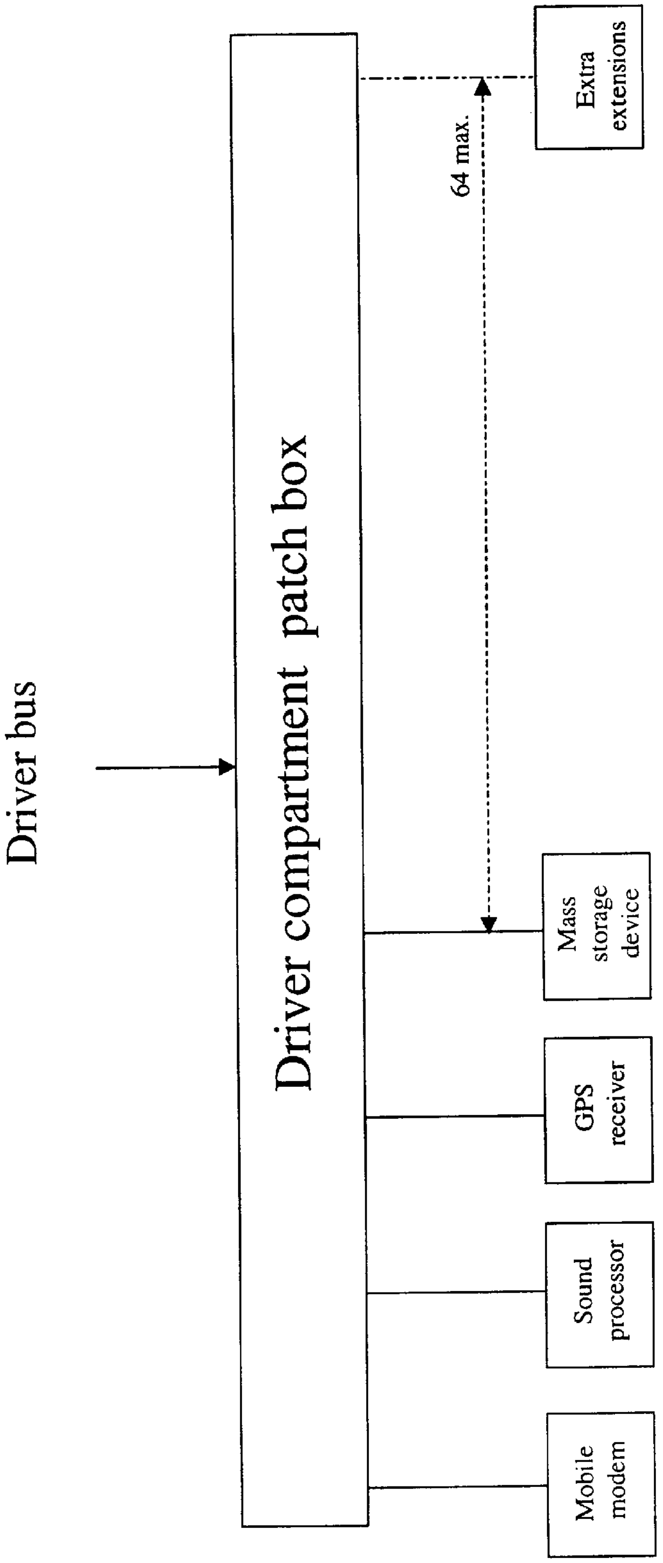
FIG. 3 is an electrical schematic of the rear patch box and its components.
Figure 4:
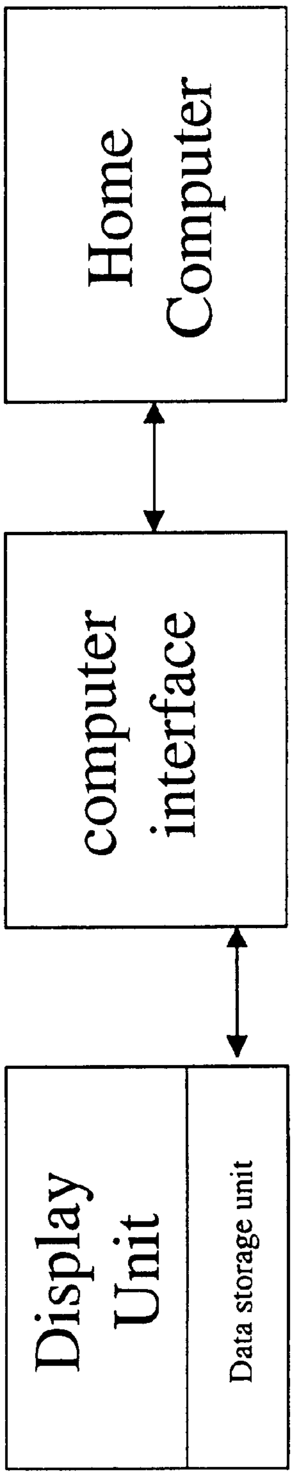
FIG. 4 is an electrical schematic of the display unit coupled to a home computer.

With reference now to the drawings, and in particular to FIG. 1 thereof, the preferred embodiment of the new and improved modular traffic information system embodying the principles and concepts of the present invention.

The present invention, the modular traffic information system is comprised of a plurality of components. Such components in their broadest context include a front patch box, a rear patch box, a driver compartment patch box, a central processing unit, a viewable display, a sound processor and a home computer. Such components are individually configured and correlated with respect to each other so as to attain the desired objective.

First provided is a front patch box. The front patch box is positionable in the motor compartment of a vehicle. The front patch box has a plurality of disconnectable forwardly facing sensors. The sensors are adapted to receive a wide range of signals. The wide range of signals includes a radio wave sensors in a horizontal plane and a radio wave sensor in a vertical plane. The wide range of signals further includes optical sensors at different angles. A plurality of disconnectable extension sensors and transmitters are provided. The sensors include a temperature sensor and a shock/vibration sensor. Also included is a plurality of disconnectable forwardly facing transmitters. The transmitters are adapted to send a wide range of signals. The wide range of signals includes an optical transmitter and a radio frequency/microwave transmitter.

A rear patch box is provided next. The rear patch box is positionable in the trunk of a vehicle. The rear patch box has a plurality of disconnectable rearwardly facing sensors. The sensors are adapted to receive a wide range of signals. The wide range of signals includes a radio wave sensor in a horizontal plane and a radio wave sensor in a vertical plane. Optical sensors at different angles are also included. Further provided is a plurality of disconnectable extension sensors and transmitters. The sensors include a temperature sensor and a shock/vibration sensor. Also included is a plurality of disconnectable rearwardly facing transmitters. The transmitters are adapted to send a wide range of signals. The wide range of signals includes an optical transmitter and a radio frequency/microwave transmitter.

Next provided is a driver compartment patch box. The driver compartment patch box is positionable in a vehicle. The driver compartment patch box has a plurality of disconnectable supplemental electronic components. The electronic components include but are not limited to a mobile modem, a sound processor, a position system receiver, a mass storage device and extra extensions. The position system receiver is a global positioning system (GPS), a Loran or the like. The mobile modem includes a mobile phone modem adapted to receive and transmit data to a central information center. In this manner easy updating of the data storage units of a sound processor unit and the central processing unit and the display unit is allowed. The mobile phone modem is also adapted to allow easy transfer of information of the plurality of sensors and transmitters and supplemental electronic components to the central processing unit. The transferred information is in "real time" as well as from stored information out of one of the data storage units.

A central processing unit is provided. The central processing unit is positionable in a vehicle. The central processing unit has a data storage unit. A front bus is coupled to the front patch box. A rear bus is coupled to the rear patch box. A driver bus is coupled to the driver compartment patch box. The central processing unit is adapted to process signals from the plurality of sensors and transmitters and supplemental electronic components. The central processing unit is further adapted to analyze the processed signals and make decisions based on the results of the combination of sensor readings and operator selections. The decisions made by the central processing unit are adapted to result in one or more of the following actions: storage of data, generating an audible message, generating a viewable message, starting an optical transmission, starting a radio transmission, and the like. The central processing unit is further adapted to manipulate any analyzed signal in a way as programmed and requested by a user. The central processing unit is further adapted to store and use stored information from the data storage unit of the central processing unit with the information adapted to be transferred from and to the data storage unit of the display unit. The central processing unit is even further adapted to auto-detect and use all of the sensors and transmitters and supplemental electronic components coupled to the front bus and rear bus and driver bus independent of which bus and which devices are connected.

Further provided is a viewable display unit. The viewable display unit is positionable in a vehicle. The viewable display unit is adapted to act as a user interface between the central processing unit and an operator. The display unit makes use of a menu structure and so called "soft-keys" to allow easy and flexible configuration and use of the system. The display unit is adapted to show the received radio signals in a graphical form from which a user may witness the strength and frequency of received signals. The viewable form includes graphical information, alphanumeric representations of the graphical information and text messages, such viewable display also has a graphical representation with the y-axis representing the strength of any received signal and the x-axis representing the frequency of any received signal. The display unit is further adapted to store information and to use stored information from the data storage unit of the display unit. Such information is adapted to be transferred to and from the data storage unit of the central processing unit.

A sound processor unit is also provided. The sound processor unit has a data storage unit. The sound processor is removably coupled to the central processing unit to generate sounds and spoken text in response to a decision made by the central processing unit. The sound processor is further adapted to store sound files in the data storage unit of sound processor unit. The sound files are adapted to be changed, replaced and added by the user by loading new sound files in the data storage unit of the display unit as through the computer interface unit. Such sound files are adapted to be automatically transferred to the data storage unit of the sound processor unit as soon as the display unit is connected to the central processing unit.

Figure 5:
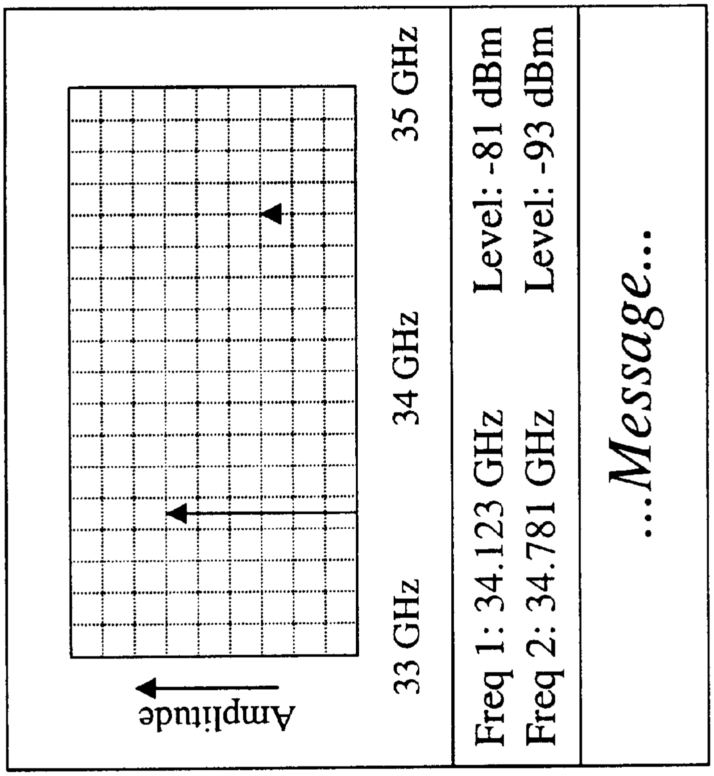
FIG. 5 is a front elevational view of the viewable display with displayed information.

The viewable display with displayed information may be seen in FIG. 5. The displayed information is shown in graphical form at the upper region. The displayed information of such graphical information is shown in alphanumeric form at the central region. The displayed information is shown in text form at the lower region for any of a plurality of messages or other information. Any or all of such displays may be utilized on the display screen to suit the desires of a user for a particular application. In addition, any or all of the displayed information may be provided in audio form as through a speaker or a vehicle radio with the output of the central processing unit being forwarded by the car interface lines.

Last provided is a home computer. The home computer has an interface. The interface is adapted to receive the display unit with its data storage unit for the manipulation and transfer of information between the data storage unit of the display unit adapted and the standard home.

The above described system has a wide variety of practical applications for user safety and convenience. Such applications include, but are not limited to:

1. Receiving public messages relating to the weather or to driving conditions such as road hazards and their locations;
2. Receiving public announcements relating to the proximity of schools or hospitals and their locations requiring unusually careful driving;
3. Receiving public advertisements relating to the location of places for food or lodging;
4. Receiving personal messages of a business or private nature;
5. Sending messages to the police, insurance company, associates, or the like relating to the theft of the vehicle or of an accident as by the user or a third party;
6. Sending personal messages of a business or private nature;
7. Sending signal commands as to open the user's garage door, turn on a light, unlock a door, or the like;
8. Monitoring vehicle usage, whether personal or business, as for maintenance or tax purposes;
9. Monitoring vehicle location for a plurality of vehicles when part of a fleet of vehicles by a business;
10. Detecting conditions relating to driving such as weather or compass direction;
11. Detecting the distance to adjacent objects such as moving vehicles while driving or objects such as non-moving vehicles while parking;
12. Detecting the user's vehicle location after a theft of the vehicle and, if desired, transmitting a signal to the police, insurance company, the user or the like;
13. Detecting the occurrence of an theft in progress of the vehicle and, if desired, generating a deterring noise or transmitting a signal to the police, insurance company, the user or the like; and
14. Detecting the presence and nature of a police radar signal, laser signal or the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A modular traffic information system for use in association with a vehicle adapted to receive and analyze signals and then generate messages in audible and viewable form, by optical and radio transmissions, in response to the analyzed signals comprising, in combination:

a front patch box positionable in the motor compartment of a vehicle with a plurality of disconnectable forwardly facing sensors adapted to receive a wide range of signals including a radio wave sensor in a horizontal plane and a radio wave sensor in a vertical plane and optical sensors at different angles and a plurality of disconnectable extension sensors and transmitters including a temperature sensor and a shock/vibration sensor and a plurality of disconnectable forwardly facing transmitters adapted to send a wide range of signals including an optical transmitter and a radio frequency/microwave transmitter;

a rear patch box positionable in the trunk of a vehicle with a plurality of disconnectable rearwardly facing sensors adapted to receive a wide range of signals including a radio wave sensor in a horizontal plane and a radio wave sensor in a vertical plane and optical sensors at different angles and a plurality of disconnectable extension sensors and transmitters including a temperature sensor and a shock/vibration sensor and a plurality of disconnectable rearwardly facing transmitters adapted to send a wide range of signals including an optical transmitter and a radio frequency/microwave transmitter;

a driver compartment patch box positionable in a vehicle with a plurality of disconnectable supplemental electronic components including but not limited to a mobile phone modem, a sound processor, a position system receiver of the type selected from the class including a global positioning system (GPS) and a Loran, a mass storage device and extra extensions, the mobile modem adapted to receive and transmit data to a central information center in order to allow easy updating of data storage units of a sound processor unit and a central processing unit and a viewable display unit, the mobile phone modem also adapted to allow easy transfer of information of the plurality of sensors and transmitters and supplemental electronic components to a central information unit, the transferred information being in "real time" as well as from stored information out of one of the data storage units;

the central processing unit positionable in a vehicle with a data storage unit and having a front bus coupled to the front patch box and a rear bus coupled to the rear patch box and a driver bus coupled to the driver compartment patch box, the central processing unit adapted to process signals from the plurality of sensors and transmitters and supplemental electronic components and to analyze the processed signals and make decisions based on the results of the combination of sensor readings and operator selections, the decisions made by the central processing unit adapted to result in one or more of the following actions: storage of data, generating an audible message, generating a viewable message, starting an optical transmission, and starting a radio transmission, the central processing unit further being adapted to manipulate any analyzed signal in a way as programmed and requested by a user, the central processing unit further being adapted to store and use stored information from the data storage unit of the central processing unit with the information adapted to be transferred from and to the data storage unit of the display unit, the central processing unit further being adapted to auto-detect and use all of the sensors and transmitters and supplemental electronic components coupled to the front bus and rear bus and driver bus independent of which buses and which devices are connected;

the viewable display unit positionable in a vehicle and adapted to act as a user interface between the central processing unit and an operator, the display unit making use of a menu structure and so called "soft-keys" to allow easy and flexible configuration and use of the system, the display unit being adapted to show the received radio signals in a graphical form from which a user may witness the strength and frequency of received signals, the viewable form including graphical information, alphanumeric representations of the graphical information and text messages, such viewable display unit also having a graphical representation with the y-axis representing the strength of any received signal and the x-axis representing the frequency of any received signal, the display unit further being adapted to store information and to use stored information from the data storage unit of the display unit, such information being adapted to be transferred to and from the data storage unit of the central processing unit and adapted to be transferred to and from a home computer through a computer interface unit;

the sound processor unit with a data storage unit removably coupled to the central processing unit to generate sounds and spoken text in response to a decision made by the central processing unit, the sound processor further being adapted to store sound files in the data storage unit of sound processor unit, the sound files adapted to be changed, replaced and added by the user by loading new sound files in the data storage unit of the display unit as through the computer interface unit, such sound files adapted to be automatically transferred to the data storage unit of the sound processor unit as soon as the display unit is connected to the central processing unit; and a standard home computer with a computer interface unit adapted to receive the display unit with its data storage unit for the manipulation and transfer of information between the data storage unit of the display unit and the standard home computer.

* * * * *